UNITED STATES PATENT OFFICE.

HANS JOACHIM HAHL, OF ELBERFELD, GERMANY, ASSIGNOR TO SYNTHETIC PATENTS CO., INC., OF NEW YORK, N. Y., A CORPORATION OF NEW YORK.

OXYQUINOLIN COMPOUNDS.

1,129,865. Specification of Letters Patent. Patented Mar. 2, 1915.

No Drawing. Application filed July 17, 1914. Serial No. 851,571.

*To all whom it may concern:*

Be it known that I, HANS JOACHIM HAHL, doctor of philosophy, chemist, citizen of the German Empire, residing at Elberfeld, Germany, have invented new and useful Improvements in Oxyquinolin Compounds, of which the following is a specification.

My invention relates to the manufacture and production of hitherto unknown oxyquinolin compounds which contain in their molecule iodin and bismuth. They can be obtained by treating quinolin compounds with bismuthoxyiodid or by treating oxyquinolin compounds of bismuth with hydrogen iodid or bismuth compounds with the hydroiodid acid salts of oxyquinolins. The new products have proved to be valuable antiseptics. They are generally yellowish-red powders insoluble in water and organic solvents which split off bismuth and iodin when treated with hydrochloric acid.

In order to illustrate the new process more fully the following example is given, the parts being by weight:—105 parts of 1.8-oxyquinolin and 242 parts of bismuthoxyiodid are finely ground to powder. The mixture is then poured over with 1000 parts of water and boiled during 3 hours while it is well stirred. After cooling the precipitate is filtered off and boiled twice with ether to remove a small quantity of oxyquinolin, then it is well dried at 100° C. The yellow-red product thus obtained is insoluble in water, benzene, alcohol, ether, ligroin, etc. When treated with hydrochloric acid bismuth and iodin are split off. The new compound is a valuable antiseptic and contains about 24 per cent. of iodin and 45 per cent. of bismuth.

Instead of the above mentioned 1.8-oxyquinolin other oxyquinolin compounds can be used such as 5-bromo-8-oxyquinolin, 5-methyl-7-iodo-8-oxyquinolin, 1.6-oxyquinolin, 5-bromo-6-oxyquinolin, 1.7-oxyquinolin, 5.7-dibromo-8-oxyquinolin, etc.

I claim:—

1. The new compounds being chemically oxyquinolins containing in their molecule iodin and bismuth and being generally yellowish-red powders insoluble in water and organic solvents splitting off bismuth and iodin when treated with hydrochloric acid; and being valuable antiseptics, substantially as described.

2. The new compound being chemically a 1.8-oxyquinolin compound containing in its molecule iodin and bismuth being a yellow-red powder insoluble in water and benzene, alcohol, ether, ligroin, etc.; splitting off bismuth and iodin when treated with hydrochloric acid; containing about 24 per cent. of iodin and 45 per cent. of bismuth; and being a valuable antiseptic, substantially as described.

In testimony whereof I have hereunto set my hand in the presence of two subscribing witnesses.

HANS JOACHIM HAHL. [L. S.]

Witnesses:
 HELEN NUFER,
 ALBERT NUFER.